United States Patent [19]

Kumagai et al.

[11] Patent Number: 4,612,260
[45] Date of Patent: Sep. 16, 1986

[54] PISTON RING MEMBER

[75] Inventors: Atsushi Kumagai; Tsutomu Tanabe; Hirokazu Yasunaga, all of Shimane, Japan

[73] Assignee: Nippon Piston Ring Co., Ltd., Tokyo, Japan

[21] Appl. No.: 638,939

[22] Filed: Aug. 9, 1984

[51] Int. Cl.$^4$ ................................................ F16J 9/26
[52] U.S. Cl. ..................... 428/667; 428/935; 428/936; 428/937; 277/235 A; 277/DIG. 6
[58] Field of Search ............... 428/667, 935, 936, 937; 277/235 A, DIG. 6; 75/126 R

[56] References Cited

U.S. PATENT DOCUMENTS 3,432,290  3/1969  Farmer ........................... 75/126 R
4,344,634  8/1982  Onozaki ........................ 277/DIG. 6

FOREIGN PATENT DOCUMENTS 210954  12/1982  Japan ............................. 75/126 A Primary Examiner—Melvyn J. Andrews
Attorney, Agent, or Firm—Sughrue, Mion, Zinn, Macpeak & Seas

[57] ABSTRACT

A piston ring having an improved wear resistance and antiseizure properties and good workability is disclosed. The piston ring is made of a martensite stainless steel comprising from 0.4 to 0.7 wt % C, 0.3 to 1.0 wt % Si, 0.5 to 1.0 wt % Mn, and 2.0 to 9.0 wt % Cr, the balance being iron and impurities. Additionally, a surface-treated layer having a quench and temper hardness ($H_RC$) of 40 to 50 is formed on at least that part of the piston ring which slides against the wall of a cylinder in which reciprocates a piston on which the piston ring is mounted. Preferably, the surface-treated layer is formed by hard Cr plating.

8 Claims, 4 Drawing Figures

PISTON RING MEMBER

BACKGROUND OF THE INVENTION

The present invention relates to a piston ring member. More particularly, the invention relates to a piston ring member suitable for use in reciprocating internal combustion engines, such as a compression ring member or an oil ring member, for instance, a side rail member for use with oil rings.

Modern internal combustion engines are designed to produce a greater power output at higher speeds, and demands upon the performance of engines are ever increasing. An equally important requirement is that of reducing the noxious content of the exhaust gas. Doing so, however, results in other problems such as reduced power output and increased fuel consumption.

Conventional products such as compression rings for use in internal combustion engines are typically made of cast iron. However, compression rings made of cast iron which are thin in the axial direction are difficult to manufacture, and those which have a relatively large cross section have a high inertia and are prone to cause a fluttering phenomenon (extraordinary vibration of rings). Another problem with compression rings made of cast iron is that their resistance to wear and heat is not great enough to permit their installation in a position near the top of the piston, which is favorable for the purpose of reducing noxious emissions. Furthermore, the conventional compression rings cannot be mounted on the piston at sufficiently small spacings to prevent the piston from being too heavy to produce a desirably high output power at a higher speed.

The use of compression rings which maintain the airtightness of the combustion chamber greatly improves the service life of an internal combustion engine. While maintaining airtightness, the width of each compression ring in its axial direction must be minimized so as to reduce the area of contact between the ring and the wall of the cylinder, thereby decreasing the frictional loss. At the same time, the weight of the piston must be reduced by using lighter compression rings and by installing them at closer spacings.

In order to meet these requirements, steel piston rings made of Si—Cr steel or 13Cr steel are currently commonly used. Si—Cr steel is inexpensive, but since it does not have great heat collapse and wear resistance, which are two very important properties for piston rings, the entire surface of a piston ring made of this steel species, or at least the upper, lower sides and the sliding surface, should be given a suitable surface treatment. 13Cr steel has a high heat collapse and wear resistance and is mechanically stronger than Si—Cr steel, and a piston ring made of 13Cr steel can be used after treating only the sliding surface. On the other hand, 13Cr steel is more costly.

Accordingly, an object of the present invention is to provide a piston ring member which is free from the defects of a compression ring made of cast iron.

Another object of the present invention is to provide a piston ring member whose cost is between those made of Si—Cr and 13Cr steels but which exhibits properties similar to those made of 13Cr steel.

Still another object is to provide a piston ring member which is easy to manufacture and which allows the internal combustion engine in which it is used to produce a greater output power at a higher speed while maintaining good airtightness of the combustion chamber.

SUMMARY OF THE INVENTION

In accordance with the above and other objects of the invention, there is provided a piston ring member having improved wear resistance and scuffing resistance, which piston ring is made of a martensite stainless steel comprising from 0.4 to 0.7 wt % C, 0.3 to 1.0 wt % Si, 0.5 to 1.0 wt % Mn, and 2.0 to 9.0 wt % Cr, the balance being iron and impurities. A surface-treated layer having a quench and temper hardness ($H_RC$) of 40 to 50 is formed on at least that part of the piston ring member which slides against the wall of a cylinder in operation. Preferably, the surface-treated layer is a hard Cr plating layer.

DESCRIPTION OF THE PREFERRED EMBODIMENTS

The piston ring member of the present invention will hereunder be described with reference to the accompanying drawings.

Figure 1:
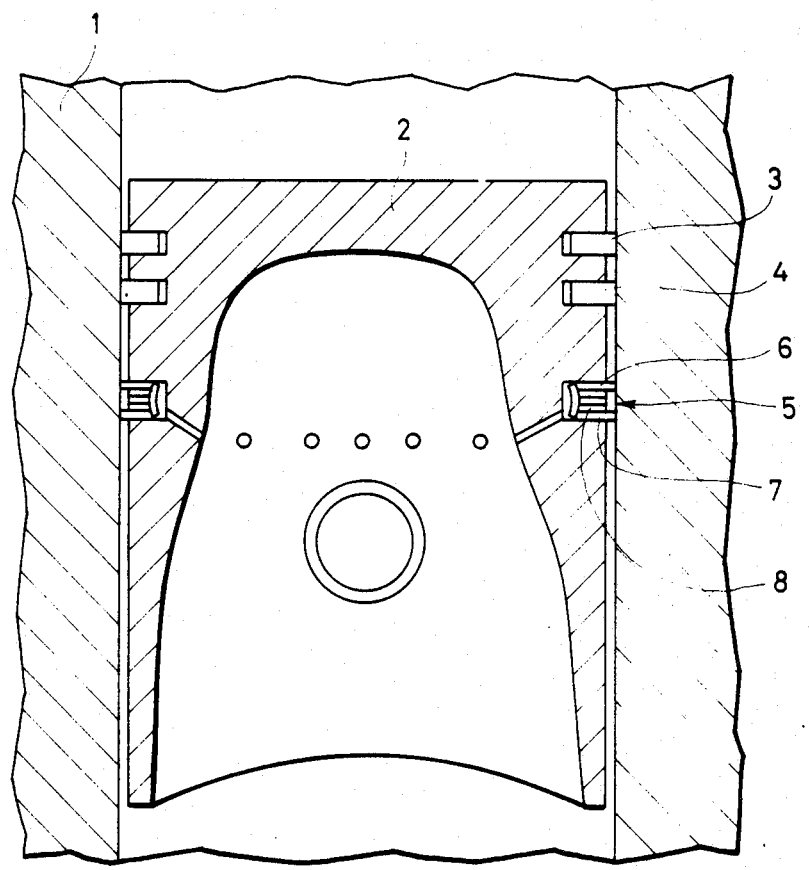
FIG. 1 is a partial longitudinal section of a cylinder of a typical internal combustion engine.
Figure 2:
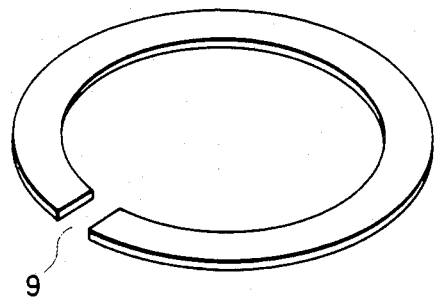
FIG. 2 is a perspective view of a compression ring.
Figure 3:
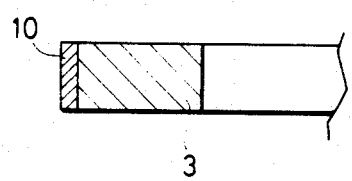
FIG. 3 is a partial cross section of the compression ring.
Figure 4:
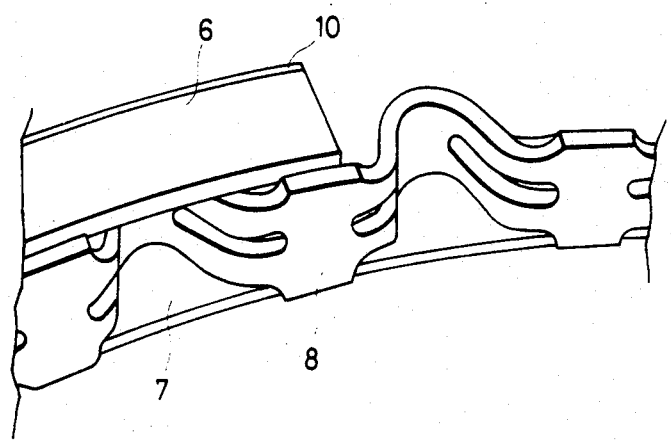
FIG. 4 is a perspective view of an oil ring.

A partial longitudinal section of a typical internal combustion engine is shown in FIG. 1, a perspective view of a compression ring is shown in FIG. 2, a partial cross section of that piston ring is shown in FIG. 3, and a perspective view of an essential part of an oil ring is depicted in FIG. 4. In these drawings, reference numeral 1 represents a cylinder; 2, a piston; 3 and 4, compression rings; 5, an oil ring composed of side rails 6 and 7 and a space expander 8; 9, the gap between the two opposing ends of the ring; and 10, a surface-treated layer. The desired piston ring must have good airtightness, high wear resistance, good scuffing resistance and a high anti-breakage. In order to produce an internal combustion engine having a higher power output at faster speeds, significant improvements must be made in these factors.

In performing research for accomplishing the present invention, the following specific objectives were set:

(1) In order to increase the rotational speed of the internal combustion engine without causing a fluttering phenomenon, and to decrease the weight of the piston by positioning the piston rings closer to the piston head (this is also effective in reducing noxious emissions and producing a greater output), a piston ring which is mechanically stronger than the conventional cast iron ring and which has a smaller width in the axial direction must be provided.

(2) Such as ring must also have sufficiently great scuffing and wear resistance as to be used as a compression ring.

(3) The ring must be less expensive than the conventional 13Cr steel ring.

(4) The material of the ring must have good workability.

The piston ring member according to the present invention is made of a material that differs clearly from the conventionally used ordinary cast iron or special (ductile or malleable) cast iron, as well as from Si—Cr and 13Cr steels. Specifically, the piston ring member of the invention is made of martensite stainless steel containing as alloying elements 0.4 to 0.7 wt % C, 0.3 to 1.0 wt % Si, 0.5 to 1.0 wt % Mn, and 2.0 to 9.0 Cr. This specific stainless steel is heat treated to provide a quench and temper hardness ($H_RC$) of 40 to 50 and to precipitate a Cr carbide.

The criticality of the content of each alloying element in the stainless steel of which the piston ring member of the present invention is made is as follows:

Carbon is necessary for providing the desired strength, hardness and wear resistance. If a thin member such as a piston ring is given a treatment such as nitriding, the very thinness of the member permits the effect of the treatment to penetrate deep into the bulk of the member, and this may embrittle the piston ring and reduce its anti-breakage factor. In order to provide the piston ring with the necessary strength, hardness and wear resistance and to improve its anti-breakage factor, the carbon content must be at least 0.4 wt %. If the carbon content exceeds 0.7 wt %, the manufacture of the wire from which piston rings are produced becomes difficult. Therefore, according to the present invention, the carbon content is limited to the range of 0.4 to 0.7 wt %.

Silicon is an inevitable carryover from the raw material of the steel. In order to achieve the desired antioxidation properties and heat collapse resistance, at least 0.3 wt % of Si is necessary. If the silicon content exceeds 1.0 wt %, the steel becomes brittle. Therefore, according to the present invention, the silicon content is limited to the range of 0.3 to 1.0 wt %.

Manganese is added to molten steel as a decarburizing agent. This element is also effective for increasing the strength and hardness properties. However, the desired effects of Mn are not achieved if its content is less than 0.5 wt %. On the other hand, it is not necessary to add more than 1.0 wt % of Mn. Therefore, according to the present invention, the Mn content is limited to the range of 0.5 to 1.0 wt %.

Chromium combines with carbon to form a carbide which contributes to providing improved wear resistance and scuffing resistance. These effects are not achieved by less than 2.0 wt % of Cr. On the other hand, the toughness of the steel is reduced if it contains more than 9.0 wt % of Cr. Therefore, the Cr content is limited to the range of 2.0 to 9.0 wt %.

Another requirement for the stainless steel of which the piston ring member of the present invention is made is that it have a quench and temper hardness ($H_RC$) in the range of 40 to 50. If the value of $H_RC$ is less than 40, the desired wear resistance is not obtained. An $H_RC$ value exceeding 50 should be avoided in order to prevent excessive wear of the mating member, thereby ensuring reliable sliding between the two members.

In order to permit its use as a piston ring, the member of the present invention is provided with a surface hardened layer 7 on at least that part of the ring which is to slide against the wall of the cylinder.

Chemical analyses of four samples of a ring member according to the present invention are compared in Table 1 below with those of three typical conventional ring members.

TABLE 1

| Sample | C | Si | Mn | Cr | Fe |
|---|---|---|---|---|---|
| A | 0.62 | 0.30 | 0.75 | 8.03 | bal |
| B | 0.45 | 0.83 | 0.73 | 4.95 | bal |

TABLE 1-continued

| Sample | C | Si | Mn | Cr | Fe |
|---|---|---|---|---|---|
| C | 0.70 | 0.80 | 0.72 | 4.85 | bal |
| D | 0.61 | 0.80 | 0.70 | 2.69 | bal |
| E | 0.65 | 0.30 | 0.70 | 13.00 | bal |
| F | 3.21 | 2.00 | 0.40 | — | bal |
| G | 0.54 | 1.50 | 0.50 | 0.70 | bal |

NOTE:
Samples A to D - present invention;
Sample E - conventional (13Cr steel);
Sample F - conventional (cast iron);
Sample G - conventional (Si—Cr steel)

Properties of two ring samples according to the present invention are compared in Table 2 with those of two conventional samples.

TABLE 2

| Sample | Modulus of Elasticity | Tensile Strength | Tension Reduction | (hardness after heat treatment: $H_RC$ 41) Uniform Elongation (%) |
|---|---|---|---|---|
| A | $1.8 \times 10^4$ | 110 to 120 | 0.6 | 6 to 7 |
| B | $1.6 \times 10^4$ | 110 to 115 | 0.6 | 7 to 8 |
| E | $2.0 \times 10^4$ | 125 to 130 | 0.5 | 4.5 to 5.5 |
| F | $1.05 \times 10^4$ | 12 to 24 | 1 | 0 |

The tension reduction was determined by the following procedure: A rod ($5\phi \times 150$ L) was bent under load at room temperature to provide a radius of curvature of 25R. Then, the sample so bent was heated at 300 degrees C. for one hour, straightened to the initial state, and again bent under load to provide the same radius of curvature. The difference between the load necessary to produce the radius of curvature of 25R with the heat-treated sample and the load necessary for producing the same radius of curvature with the unheated sample was calculated. The smaller the difference, the smaller the tension reduction. In Table 2, the tension reductions of the respective samples are indicated as relative values, with the tension reduction of sample F (cast iron ring) being taken as 1.

As can be seen from Table 2, the piston ring members of the present invention have higher moduli of elasticity and tensile strength values, and have tension reductions about 40% less than cast iron rings.

As a component of an internal combustion engine, the piston ring is mounted on a piston and the piston fitted into a cylinder. The ring should have a specified gap between the two opposing ends so that it can expand to achieve intimate contact with the wall of the cylinder. The tension or self-expanding property of the piston ring decreases with temperature, which of course increases due to the combustion of fuel during the normal operation of the engine. If this decrease in the tension of the piston ring is too great, gas leakage can occur during the compression stroke. The resulting loss in compressive force causes a pressure drop, and hence, a lower heat efficiency. Furthermore, the "channneling" of the combustion gas tends to break the oil film on the wall of the cylinder and hence cause scuffing or exesive wear. However, by reducing the amount of the tension reduction as in the case of the piston ring member of the present invention, the internal combustion engine can be operated to ensure a consistently high performance.

While various materials are available for making piston rings in accordance with the present invention, a martensite steel structure is employed having the alloy composition specified above and which has been treated to produce a Cr carbide having a hardness ($H_RC$) of 40 to 50. By using this alloy structure, the width of the piston ring in the axial direction can be reduced to about half that for the conventional case. Furthermore, the piston ring of the present invention has properties equal to those of the prior art cast iron ring characteristics close to those of a 13Cr steel ring to thus ensure an internal combustion engine capable of producing an increased output power at higher speeds.

Characteristics of the piston ring members of the present invention relative to those of a conventional product are shown in Table 3.

TABLE 3

| Sample | Antiseizure Properties | Heat Collapse Resistance | Wear Resistance | Workability | Corrosion Resistance |
|---|---|---|---|---|---|
| A | ○ | ○ | △ | ◉ | ○ |
| B | △ | ○ | △ | ◉ | ○ |
| C | ○ | ○ | ○ | ◉ | ○ |
| D | ○ | △ | △ | ◉ | △ |
| E | ○ | ◉ | ◉ | ○ | ◉ |

Rating index: ◉ > ○ > △

Steel piston rings are manufactured by first coiling a wire into rings, which are then properly worked and cut into final products having the shape shown in FIG. 2. For this purpose, it is important that the material of the piston ring member according to the present invention have good workability. In particular, to avoid bending failure or uneven coiling and to achieve sufficient and uniform elongation, good workability is absolutely necessary. As will be understood from Tables 2 and 3, the martensite structure used in the present invention has better workability than 13Cr steel, and an appreciable advantage is reflected in the high uniformity of elongation of that martensite structure.

The wear of the outer periphery of a piston ring has significant effects on the airtightness of the combustion chamber, and in order to provide an internal combustion engine capable of producing a greater power output at a faster speed, the piston ring should not undergo more than minimal wear. In order to obtain this characteristic, the piston ring of the present invention is not made of a single material only; rather, that part of the piston ring which slides against the wall of the cylinder and which requires high wear resistance and good scuffing resistance for maintaining good airtightness between the wall of the cylinder and the piston ring upon expansion during the operation of the internal combustion engine is provided with a surface-treated layer which is hard and which has good scuffing resistance. Various surface treating techniques may be employed for providing this facing layer, including hard Cr plating, porous Cr plating, compound plating, Cr spraying and Mo spraying. Particularly good results are obtained when the facing layer is made by plating hard Cr. In this case, that part of the piston ring which slides against the wall of the cylinder has a hardness ($H_V$) of 850 or more but has a low frictional coefficient, thereby exhibiting good wear resistance, scuffing resistance and corrosion resistance. Thus, high airtightness is ensured by the sliding face of the piston ring. This effect is further enhanced due to the self-stretching property of the piston ring, which can be ascribed to the high modulus of elasticity, great mechanical strength and small reduction in tension, three characteristics inherent in the material of the piston ring member of the present invention.

Being made of martensite stainless steel having the composition shown above, the piston ring member of the present invention has sufficient corrosion resistance for use with internal combustion engines.

While the primary components of the piston ring member of the present invention are C, Si, Mn, Cr and Fe, other elements such as Mo, Ni and V may also be added in suitable proportions for the purpose of providing further improved corrosion resistance and mechanical strength.

It is necessary that at least that part of the outer periphery of the piston ring which slides against the wall of the cylinder have a surface-treated layer. Needless to say, this surface-treated layer may be provided on both the upper and lower sides of the piston ring, as well as its sliding surface.

In short, the piston ring member of the present invention exhibits excellent characteristics such as high airtightness, good scuffing, and very high anti-breakage when it is used as a compression ring or an oil ring, particularly, as a side rail. The member can be made thin enough to reduce not only its own weight but also the weight of the piston assembly, thereby minimizing losses of energy due to inertia. Furthermore, the piston ring member of the present invention has such a small area of contact with the wall of the cylinder that it has another advantage of reduced frictional loss. Because of these features, the piston ring member of the present invention permits a given internal combustion engine to produce a higher power output while issuing a reduced amount of noxious emissions.

We claim:

1. A piston ring member having improved wear resistance and scuffing resistance, said piston ring member being made of a martensite stainless steel consisting of from 0.4 to 0.7 wt % C, 0.3 to 1.0 wt % Si, 0.5 to 1.0 wt % Mn, and 2.0 to 9.0 wt % Cr, the balance being iron and impurities, and a surface-treated layer having a quench and temper hardness ($H_RC$) of 40 to 50 being formed on at least that part of said piston ring member which slides against a wall of a cylinder in which reciprocates a piston on which said piston ring member is mounted.

2. The piston ring member according to claim 1, wherein said surface-treated layer is a hard Cr plated layer.

3. The piston ring member according to claim 1, wherein said surface-treated layer is a porous Cr plated layer.

4. The piston ring member according to claim 1, wherein said surface-treated layer is a compound plated layer.

5. The piston ring member according to claim 1, wherein said surface-treated layer is a sprayed Cr layer.

6. The piston ring member according to claim 1, wherein said surface-treated layer is a sprayed Mo layer.

7. The piston ring member according to claim 2, wherein said surface-treated layer has a hardness ($H_V$) of at least 850.

8. The piston ring member according to claim 2, wherein said piston ring member is provided with upper and lower side surfaces, and wherein said surface-treated layer is additionally provided on said upper and lower side surfaces.

* * * * *